March 28, 1950     D. ENTWISTLE     2,502,406
BONDING OF RAYON FILAMENTS TO RUBBER
Filed July 5, 1946
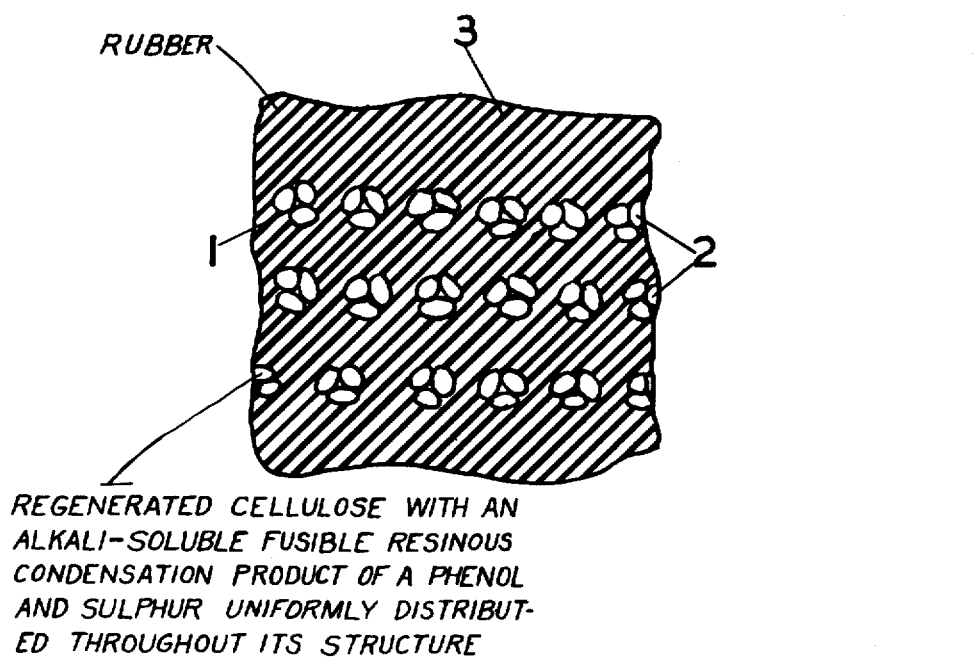
Inventor
DONALD ENTWISTLE
by his attorneys
Howson and Howson Patented Mar. 28, 1950

2,502,406

UNITED STATES PATENT OFFICE 2,502,406

BONDING OF RAYON FILAMENTS TO RUBBER

Donald Entwistle, Coventry, England, assignor to Courtaulds Limited, London, England, a British company Application July 5, 1946, Serial No. 681,601
In Great Britain August 31, 1945

6 Claims. (Cl. 154—52)

This invention relates to the bonding of regenerated cellulose rayon filaments to rubber. The term "regenerated cellulose rayon" as used herein refers to rayon made by either the viscose process or the cuprammonium process and also to rayon made by substantially complete saponification of cellulose ester threads.

It is well-known to employ cords and fabrics of regenerated cellulose rayon for the purpose of reinforcing rubber articles such as pneumatic tyres. As the adhesive bond between rubber and rayon is poor, many proposals have already been made to improve the adhesion by treating the rayon with various compositions such as resinous compositions. United States Patent No. 2,128,229 describes an improved method of causing rubber to adhere to other materials, including rayon cord, which comprises pretreating the rubber or other material to which it is to be joined with an adhesive which comprises an aqueous solution or dispersion of heat-hardening aldehyde resin-forming substances, for example, phenolic compounds and aldehydes, which are water-soluble to the extent of 0.5 per cent to 5.0 per cent by weight, drying the adhesive and effecting adhesion of the rubber and material while converting the resin-forming substances into infusible, insoluble resin.

I have now found that I can improve the adhesion of regenerated cellulose rayon to rubber by using as the adhesive composition, an alkali-soluble resinous condensation product of a phenol and sulphur.

The resinous condensation products of phenols and sulphur may be prepared by melting together a phenol and sulphur, adding an alkaline catalyst such as caustic soda, and heating the mixture under reflux condenser until the evolution of hydrogen sulphide ceases. The preparation of resin in this manner is described for example in British Specifications Nos. 173,313 and 186,107.

For the purposes of the present invention the resin must be soluble in alkali; it is therefore preferable to avoid the presence of excess sulphur in the final reaction product.

The phenol used in the preparation of the resin may be the ordinary monohydric phenol or may be a dihydroxy phenol such as resorcinol or a trihydroxy phenol such as phloroglucinol. Substituted phenols such as ortho chlorphenol, or a cresol such as ortho cresol may be used.

The adhesive composition used according to the present invention may be associated with the rayon cord during or after its production, or the adhesive may be added to the initial starting material from which the thread is made. For example, as applied to the viscose process, the adhesive preferably in the form of an aqueous alkaline solution, may be applied to the wet thread while the latter is in the cake form as obtained by the collection in a centrifugal box or may be applied to the finished dried thread. Alternatively, the adhesive may be added as an aqueous alkaline solution to the viscose, the threads being prepared from the thus-compounded viscose in the usual way, for example as described and claimed in United States Patent No. 2,192,074. In the preparation of the aqueous alkaline solution of the phenol-sulphur resin, it is preferable to avoid the presence of excess alkali in order to prevent any undue damage of the rayon filaments.

The threads associated with the phenol-sulphur resin by any of the methods just described can be employed for the purpose of reinforcing rubber by the usual methods of the industry as used for cotton cords. The phenol-sulphur resins in addition to the improved adhesion have the particular advantage that they are stable in alkaline solution, that is, unlike phenol-aldehyde resins they show little or no tendency to pass on standing or on heating into an insoluble and infusible form.

A composite article according to the present invention is illustrated by way of example in the accompanying diagrammatic drawing which is an enlarged fragmentary section of a rubber article in which cords are embedded. Referring to the drawing, cords 1 formed by twisting together three continuous-filament regenerated cellulose yarns 2, are embedded in rubber 3; in accordance with the invention each filament of the yarn 2 forming the cords 1 has substantially uniformly distributed throughout its structure an alkali-soluble fusible resinous condensation product of a phenol and sulphur.

The following examples illustrate the present invention. The parts and percentages are by weight.

Example 1

This example describes the after-treatment of a thread with a resinous phenol-sulphur condensation product. The resinous adhesive is prepared as follows:

10 parts of sulphur, 26 parts of ortho chlorphenol dissolved in 20 parts of hot water, and 8.5 parts of caustic soda are melted together at 100° centigrade and the mixture is then boiled under a reflux condenser for 30 hours. A resinous yellow powder separates which is soluble in alkali. A 2 per cent solution of the product is prepared by dispersing it in water and adding caustic soda until the product just dissolves. Viscose rayon tyre cord prepared as described in United States Patent No. 2,192,074 is soaked in this solution for 20 minutes at 40° centigrade and dried in hot air.

The improved adhesion of the tyre cord prepared as in this example may be shown by comparing the adhesion to rubber of (a) the cord prepared as in Example 1 and (b) cord as used in Example 1 but which has not been treated with the adhesive composition.

The comparison may be carried out as follows:

A number of 10 inch lengths of each type of cord are laid lengthwise on the surface of a slab of an unvulcanised rubber composition measuring 10 inches by 3 inches by 1/8 inch and gently pressed by hand into the rubber. The composition of the rubber stock is as follows, the parts being by weight:

Smoke sheets 100 parts, zinc oxide 40 parts, sulphur 3.5 parts, pine tar 1 part, stearic acid 2 parts, antioxidant (phenyl beta-naphthylamine) 1.5 parts and accelerator (mercaptobenzthiazole) 0.5 part.

The rubber surface with the cords therein is now covered by a sheet of regenerated cellulose while the other surface is covered with a canvas sheet which is in turn covered by a sheet of regenerated cellulose. The whole assembly is now placed in a platen press and vulcanised at 30 lb. per square inch steam pressure for 60 minutes. The rubber slab is removed from the press and the sheets of regenerated cellulose stripped off giving a rubber slab having the cords buried therein with the upper surfaces flush with the surface of the rubber. The canvass backing serves to render the slab inextensible while carrying out the adhesion tests. One end of each cord is now stripped out for about one inch and pulled in a direction along the surface of the rubber, the cord being bent back through an angle of 180° during the test. The pull required to separate the rubber and the cord is determined and it is found that the adhesion of the resin-treated cord (a) is two and half times as great as the adhesion of the untreated cord (b).

The coating procedure described in this example may be employed for improving the adhesion to rubber of regenerated cellulose rayon cords obtained by saponification of cellulose acetate threads.

Example 2

In this example, the resinous phenol-sulphur condensation product is added to the viscose. A 4 per cent solution of the resin produced as described in Example 1 is prepared by dispersing the resin in water and adding caustic soda until the resin just dissolves. A sufficient quantity of this solution is added to viscose containing 7.4 per cent of cellulose to give one per cent of resin calculated on the cellulose content of the viscose. The viscose is then extruded into a precipitating bath containing 9.5 per cent of sulphuric acid, 20 per cent of sodium sulphate and 4 per cent of zinc sulphate and the thread is stretched in accordance with the process described in United States Patent No. 2,192,074. The thread is then washed and dried in the usual way.

The adhesion of the thread so obtained to rubber, when tested in the manner described in Example 1 gave an adhesion of the same order as the adhesion of the resin-coated thread (a) prepared as in Example 1.

Example 3

In this example the resinous phenol-sulphur product is applied to thread in cake form, before the thread is first dried.

Viscose containing 7.4 per cent of cellulose is formed into a thread, stretched and collected in cake form in accordance with example 1 of United States Patent No. 2,192,074. The cakes are then treated with liquids using the apparatus described in British Specification No. 483,586. As described therein, the cakes are threaded on to a receptacle provided with projecting cake-carrying arms, supported on rails above a standpipe and surrounding tank. In operation the receptacle is placed over a succession of holes through which various treating liquids are forced, the liquid passing continuously through the cakes and falling into the surrounding tank. According to the procedure of the present invention, the cakes are first washed with water, then desulphurised in the usual manner with ammonium sulphide solution, then washed with water again and finally treated with a 2 per cent solution of the resin produced as in Example 1, prepared by dispersing the resin in water and adding caustic soda until the resin just dissolves. The cakes are then removed from the receptacle and dried in the usual way to give threads containing the resin adhesive.

The adhesion to rubber of the thread so produced was the same as that of the thread (a) prepared as in Example 1.

Example 4

The resinous adhesive is prepared as follows:

55 parts of resorcinol, 25 parts of sulphur and 0.5 part of caustic soda are melted together, the temperature of the fused mixture is then raised to 140° centigrade and the mixture boiled under a reflux condenser until the evolution of hydrogen sulphide ceases, an operation taking about 3 hours. On cooling, a brittle alkaline soluble dark-brown resin is obtained. Viscose rayon cord was soaked in a 2 per cent alkaline solution of this resin.

The adhesion to rubber of cords produced from threads so treated was comparable with that of the thread (a) of Example 1.

The 55 parts of resorcinol employed in Example 4 may be replaced by an equimolecular proportion of other phenols, as for example by 54 parts of ortho cresol or 63 parts of phloroglucinol.

Example 5

The resinous adhesive is prepared as follows:

14 parts of beta naphthol, 4 parts of sulphur, 3 parts of caustic soda and 8 parts of water are refluxed together until the evolution of hydrogen sulphide ceases. The mixture is now steam distilled to remove unchanged beta naphthol and acidified. A soft buff-coloured resin separates and this is removed, washed with water and dried. For coating rayon threads to improve the adhesion to rubber, the resin is dissolved in the minimum amount of caustic soda.

What I claim is:

1. A composite article comprising vulcanised rubber and continuous-filament, regenerated cellulose cords embedded in the rubber, said cords having an alkaline-soluble, fusible, resinous condensation product of a phenol and sulphur uniformly distributed throughout each filament of the cords whereby the adhesion between the rubber and the cords is improved.

2. A composite article as claimed in claim 1 in which the phenol is ortho-chlorphenol.

3. A composite article as claimed in claim 1 in which the phenol is resorcinol.

4. A composite article as claimed in claim 1 in which the phenol is ortho cresol.

5. A composite article as claimed in claim 1 in which the phenol is phloroglucinol.

6. A composite article as claimed in claim 1 in which the phenol is beta-naphthol.

DONALD ENTWISTLE.

REFERENCES CITED

The following references are of record in the file of this patent:

UNITED STATES PATENTS

| Number | Name | Date |
|---|---|---|
| 1,523,340 | Battegay | Jan. 13, 1925 |
| 2,002,822 | Mahn | May 28, 1935 |
| 2,017,993 | Seymour | Oct. 22, 1935 |
| 2,035,098 | Seaman | Mar. 24, 1936 |
| 2,065,941 | Lane | Dec. 29, 1936 |
| 2,068,003 | Blake et al. | Jan. 19, 1937 |
| 2,128,229 | Charch et al. | Aug. 30, 1938 |
| 2,252,999 | Wallach | Aug. 19, 1941 |
| 2,256,153 | Riehl | Sept. 16, 1941 |
| 2,256,194 | Crawford | Sept. 16, 1941 |

FOREIGN PATENTS

| Number | Country | Date |
|---|---|---|
| 186,107 | Great Britain | Sept. 11, 1922 |
| 278,684 | Great Britain | Jan. 14, 1929 |

OTHER REFERENCES

Ellis: "Chemistry of Synthetic Resins," 1935, Rheinhold, vol. II; pages 1189–1192.